United States Patent
Kraus et al.

(10) Patent No.: US 6,949,025 B1
(45) Date of Patent: Sep. 27, 2005

(54) DOWNHOLE MOTOR UNIVERSAL JOINT ASSEMBLY

(75) Inventors: James E. Kraus, Kingwood, TX (US); Gary W. Lambert, Kingwood, TX (US)

(73) Assignee: Black Warrior Wireline Corp., Columbus, MS (US)

( * ) Notice: Subject to any disclaimer, the term of this patent is extended or adjusted under 35 U.S.C. 154(b) by 0 days.

(21) Appl. No.: 09/707,354

(22) Filed: Nov. 7, 2000

(51) Int. Cl.[7] ............................................. F16D 3/221
(52) U.S. Cl. ............................................. 464/19; 464/143
(58) Field of Search ........................... 464/15, 18, 19, 464/20, 140, 141, 142, 143, 155; 175/74, 106; 384/610

(56) References Cited

U.S. PATENT DOCUMENTS

| | | | | |
|---|---|---|---|---|
| 1,838,310 A | * | 12/1931 | Hubbel | 464/140 X |
| 2,875,599 A | * | 3/1959 | Gregory | 464/15 X |
| 4,683,964 A | | 8/1987 | Wenzel | 175/106 |
| 4,745,982 A | | 5/1988 | Wenzel | 175/74 |
| 4,772,246 A | | 9/1988 | Wenzel | 464/117 |
| 4,813,497 A | | 3/1989 | Wenzel | 175/74 |
| 5,000,723 A | | 3/1991 | Livingstone | 464/140 |
| 5,052,501 A | | 10/1991 | Wenzel et al. | 175/74 |
| 5,078,650 A | | 1/1992 | Foote | 464/104 |
| 5,094,305 A | | 3/1992 | Wenzel | 175/74 |
| 5,129,797 A | | 7/1992 | Kanamaru | 417/500 |
| 5,267,905 A | | 12/1993 | Wenzel et al. | 464/140 |
| 5,288,271 A | | 2/1994 | Nelson et al. | 464/114 |
| 5,343,966 A | | 9/1994 | Wenzel et al. | 175/74 |
| 5,495,901 A | | 3/1996 | Livingstone et al. | 175/74 |
| 5,704,838 A | | 1/1998 | Teale | 464/19 |
| 6,203,435 B1 | * | 3/2001 | Falgout, Sr. | 464/18 |

* cited by examiner

*Primary Examiner*—Greg Binda
(74) *Attorney, Agent, or Firm*—Bracewell & Patterson, L.L.P.

(57) ABSTRACT

A downhole motor universal joint assembly includes a female coupler which receives a male end of a drive shaft. The female coupler has a retainer that prevents separation of the male end and the female coupler. The retainer has a rearward extending skirt with flow passages to prevent solid material from accumulating in an exposed space between the female coupler and the male coupler. Also to prevent solid material from accumulating in this space, a shoulder formed on the male coupler diverts the flow of well fluid towards the outside of the joint. Thrust loads are transmitted between the male coupler and the female coupler by a thrust ball positioned between the male coupler and the female coupler. Torque loads are transmitted between the male coupler and the female coupler by a plurality of balls positioned in annularly spaced concave pockets on the exterior surface of the male coupler. The balls move axially within grooves formed on the inside wall of the female coupler, allowing limited omnidirectional angular movement of the drive shaft and the female coupler with respect to one another. A compensating piston has seals to prevent well fluid from entering the joint. By moving axially within the space between the female and male couplers, the compensating piston equalizes the pressure within the joint and the pressure in the well fluid.

17 Claims, 2 Drawing Sheets

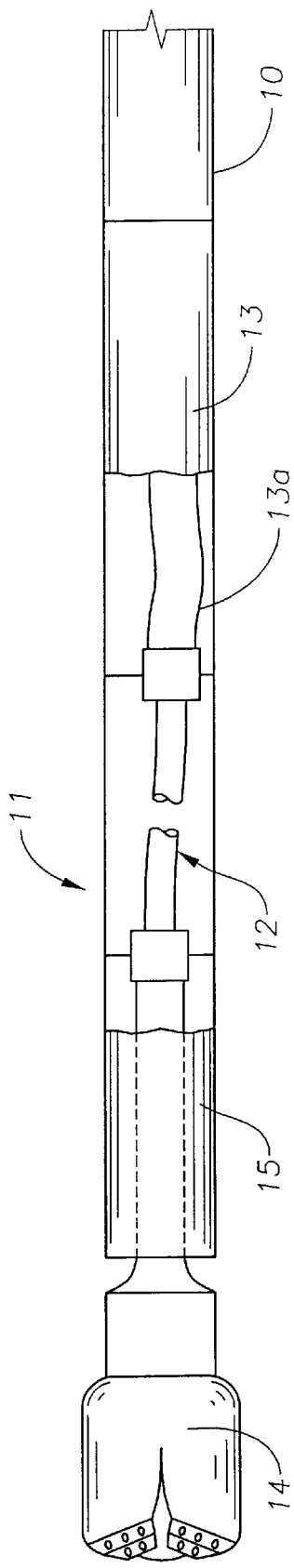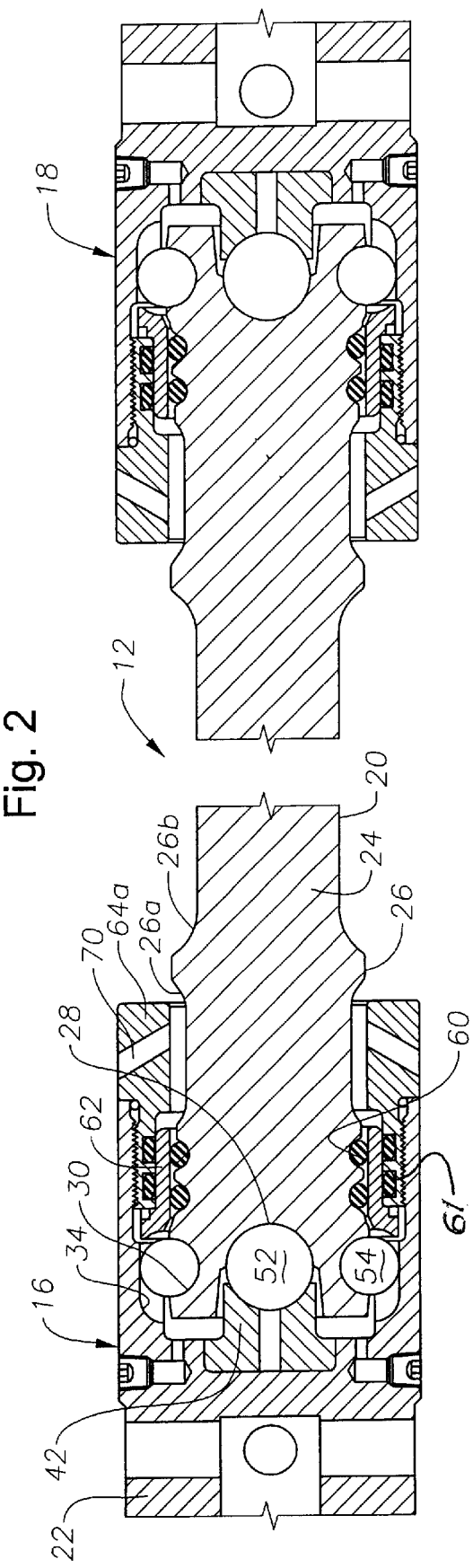

DOWNHOLE MOTOR UNIVERSAL JOINT ASSEMBLY

TECHNICAL FIELD

This invention relates to a universal joint assembly for use with drilling motors in downhole oil drilling applications and also to downhole progressive cavity pumps.

BACKGROUND OF THE INVENTION

The rotary output shaft or rotor of conventional downhole motors used in the oil drilling industry moves in an eccentric manner. In order for the drill bit to perform properly, this eccentric motion must be converted into a concentric motion. This conversion is typically accomplished by using a drive shaft with universal joint connections between the downhole motor and the bearing assembly that rotates the drill bit. Progressive cavity well pumps also have rotors that move in an eccentric manner.

In order to extend the useful life of the universal joints, seals are used to prevent abrasive drilling fluids from entering the joints. Early seals were relatively simple, comprising a flexible sleeve, typically elastomeric, placed over the entire universal joint assembly. Once the sleeve was installed, the joint assembly was filled with lubricating fluid under appropriate pressure. Although this sealing method was inexpensive and easily installed, the sleeves were prone to slide out of position or to become caught between the joint members, or to burst due to pressure fluctuations. As a result, drilling fluid would penetrate the joint, causing the premature failure of the joint.

U.S. Pat. No. 5,267,905 discloses a universal joint assembly with polypack sealing elements to prevent drilling fluid from entering the joint. Springs installed in the retainer of the joint push the seals against the joint housing regardless of the angular displacement of the shaft within the housing. Drilling fluid communicates with the lubricant to equalize the pressure within the lubricant area with the hydrostatic pressure of the drilling fluid.

U.S. Pat. No. 5,704,838 discloses a universal joint assembly with a multi-component seal to keep drilling fluid out of the joint. The seal structure comprises a seal element and a seal carrier arrangement. The seal carrier arrangement includes a carrier member, biasing means such as a Belleville spring, and a retaining ring to hold the carrier member in place. Two O-ring seals positioned on the carrier arrangement work with the seal element to prevent drilling fluid from entering the joint.

While these seal arrangements are superior to the flexible sleeve, further improvements are desired. In some instances, the joints have been unsuitable for use at high operating temperatures because of the types of seal elements used. Also, rotational angular misalignment between the shaft and the housing may cause some types of seals to exhibit permanent deformation and to fail if worked beyond the fatigue limit.

SUMMARY OF THE INVENTION

The universal joint assembly of this invention generally comprises a tubular housing or female coupler; a tubular drive shaft, the male end of which is received within the female coupler; spherical bearings that allow limited omni-directional pivotal movement between the female coupler and the drive shaft; a seal assembly to prevent drilling fluid from entering the joint; and a retainer threadedly installed as part of the female coupler to hold the seal assembly and the bearings in place. The retainer has an open ended skirt surrounding the male coupler.

The seal assembly of the invention further comprises a compensating member positioned between the retainer and the male end of the drive shaft. One end of the compensating member is in contact with the drilling fluid surrounding the joint. The other end of the compensating member is in contact with the lubricating fluid which fills the joint.

The compensating member preferably comprises a piston sleeve sealed by sets of O-rings to prevent drilling fluid from entering the joint. Although constrained radially by the shaft and the retainer, the compensating piston is free to move axially in the space between the drive shaft and the retainer. This motion works to equalize the internal pressure within the lubricant-filled interior of the joint and the external pressure of the drilling fluid, decreasing the pressure differential across the O-ring seals and reducing the likelihood that the seals will fail. The male end of the coupler also cycles angularly relative to the compensating piston due to orbital motion of the drive shaft.

Other features of the invention reduce the amount of well fluid entering the joint by reducing impingement. A baffle or annular shoulder is formed on the drive shaft just outside of each female coupler. The shoulder is a raised band that diverts some of the flow of well fluid away from the opening between the drive shaft and the skirt portion of the female coupler, causing less well fluid to enter this space. By preventing the accumulation of solid particles in the space between the skirt and the drive shaft, these flow passages reduce the likelihood of well fluid entering the joint and also insure free angular movement of the drive shaft relative to the female coupler.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 1 is a schematic view showing generally a downhole motor drive shaft universal joint assembly of the invention installed in a drill string, near the downhole end of the drill string.

FIG. 2 is a longitudinal section view of a downhole motor drive shaft universal joint assembly made in accordance with the invention.

DETAILED DESCRIPTION OF THE PREFERRED EMBODIMENT

Figure 3:
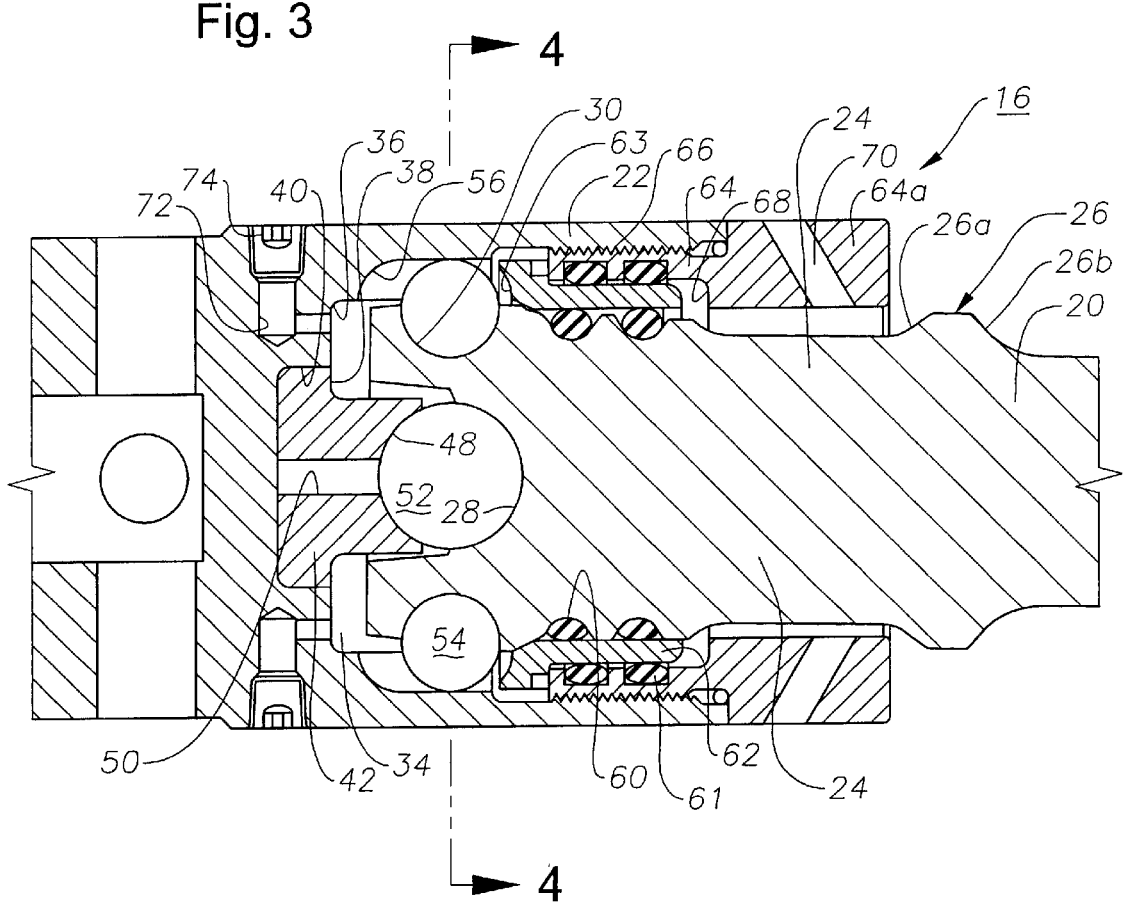
FIG. 3 is an enlarged longitudinal section view of one of the universal joints shown in FIG. 2.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

FIG. 1 shows a drill string 10 as is well known in the art. A downhole drilling motor 11 is secured to drill string 10. Drilling motor 11 has a power section 13 comprising a helical rotor 13a that rotates eccentrically within an elastomeric stator. A universal joint assembly 12 is connected between the rotor 13a and a shaft of a concentrically rotating bearing assembly 15. A drill bit 14 is connected to the opposite end of the shaft of bearing assembly 15. The drilling fluid pressure causes shaft 13a to rotate eccentrically. Drill bit 14, on the other hand rotates relative to drill string 10 concentrically about an axis. Universal joint 12 converts the eccentric rotation to concentric rotation.

The drilling fluid is pumped under pressure down drill string 10 and through mud motor 11 to the rotary drill bit 14 at the bottom of the borehole. The fluid flushes cuttings and chips away from drill bit 14 and carries them to the surface. As explained earlier, the presence of drilling fluid on the exterior of drive shaft universal joint assembly 12 places a great deal of pressure on the universal joint seals, often causing premature failure of the seals and ultimately of the universal joint assemblies themselves.

As further shown in FIG. 2, the universal joint assembly 12 comprises two universal joints 16 and 18, connected by a drive shaft 20. Universal joint 16 is connected to the shaft of bearing assembly 15 (FIG. 1) while the other is connected to the orbital shaft 13a of power section 13. Each universal joint 16 and 18 is identical and, as shown in FIGS. 2 and 3, includes a female receptacle or coupler 22 which receives a male end 24 of the drive shaft 20. Drive shaft end 24 has a radially enlarged annular band or shoulder 26, a concave spherical end pocket 28, and a plurality of annularly spaced concave spherical side pockets 30. Shoulder 26 has forward and rearward facing surfaces 26a, 26b that are inclined about 45 degrees relative to the axis of drive shaft 20. A central portion of shoulder 26 is cylindrical.

Referring to FIG. 3, female coupler 22 has an exterior surface exposed to drilling fluid and defines an interior chamber 34. Interior chamber 34 is defined by side walls 36 an end wall 38. A cylindrical recess 40 is formed in the center of end wall 38 to hold a ball seat 42. Ball seat 42 has a forward end formed to fit tightly within the cylindrical recess 40 in female coupler end wall 38. Ball seat 42 has an opposite end that terminates in a concave spherical surface 48. An internally threaded passage 50 extending axially through ball seat 42 facilitates removal of ball seat 42 from cylindrical recess 40 for maintenance or repair.

Figure 4:
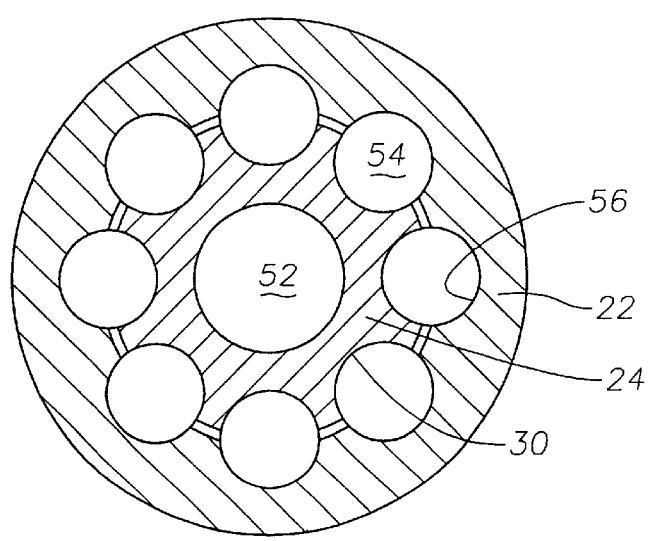
FIG. 4 is a transverse cross-sectional view taken along line 4—4 in FIG. 3.

A spherical thrust ball 52 is positioned in the space between the spherical end pocket 28 of drive shaft 20 and the concave surface 48 of ball seat 42. A plurality of balls 54 are located in the spherical side pockets 30 of drive shaft 20 for transmitting torque. Each ball 54 can move axially within a side pocket or groove 56 located on the side wall 36 of female coupler interior surface 34. The relative positions of thrust ball 52, balls 54, drive shaft 20, and female coupler 22 can be seen in FIG. 4. While the preferred embodiment shown in FIG. 4 utilizes a total of eight balls 54, the number of balls may be varied as needed for a particular application.

The interior of universal joint 16 is protected from drilling fluid by a seal assembly located between female coupler 22 and drive shaft male end 24. As can be seen by the enlarged view in FIG. 3, the seal assembly includes two sets of O-ring seals 60, 61 and a compensating piston 62 positioned between female coupler 22 and male end 24. Compensating piston 62 is a rigid sleeve sealed on its inner diameter by inner seals 60 and on its outer diameter by outer seals 61. Piston 62 is free to move axially a limited distance in a forward direction toward end wall 38. The position shown in FIG. 3 is an initial position prior to operation. The hydrostatic pressure of drilling fluid acts against piston 62, equalizing the pressure of lubricant in chamber 34 with that of the exterior. Also, the hydrostatic pressure pushes piston 62 in a forward direction toward end wall 38 as lubricant is depleted during drilling. Piston 62 has a concave forward end that abuts balls 54 when in the most forward position, preventing further forward movement.

Compensating piston 62 has an inner diameter significantly larger than the outer diameter of male end 24, allowing male end 24 to move angularly within piston 62 due to the orbital motion of female coupler 18 (FIG. 2). In FIG. 3, a lower side of male end 24 touches piston 62, while the upper side of male end 24 is considerably spaced radially from piston 62. The angular movement of male end 24 relative to piston 62 continuously cycles around piston 62 due to the orbital motion. Piston 62 is free to move radially relative to female coupler 22 with the constant compression and tension of the two sets of o-ring seals 60, 61.

Female coupler 22 includes a retainer 64, which is secured to female coupler 22 by means of a mating threaded engagement 66. Retainer 64 defines a radially inward-facing annular shoulder 68. Piston 62 is positioned between balls 54 and annular shoulder 68 of retainer 64. A clearance is located between shoulder 68 and compensating piston 62. Outer seals 61 are located within grooves in an inner diameter portion of retainer 64.

Retainer 64 has a rearward extending skirt portion 64a that extends rearward past compensating piston 62 and has an open rearward end. A plurality of flow passages 70 extend laterally through skirt 64a to prevent solid material in the drilling fluid from accumulating in the annular space between skirt 64a and male coupler 24. Flow passages 70 are inclined in a rearward direction from the outer diameter to the inner diameter of skirt 64a. The rearward end of skirt 64a terminates forward of forward shoulder portion 26a.

A plurality of ports 72, are located in female coupler 22 near end wall 38. Ports 72 communicate chamber 34 with the exterior for filling lubricant into chamber 34. A plug 74 secures within each port 72 for sealing after filling.

The use and operation of the downhole motor universal joint assembly will now be described with reference to FIGS. 1–3. After universal joint assembly 12 is assembled, cavity 34 of female coupler 22 is filled with a thick lubricant via ports 72. Universal joint 16 is secured to the shaft of bearing assembly 15. Universal joint 18 is secured to rotor 13a of power section 13. Drilling mud will be pumped down drill string 10, causing rotor 13a of power section 13 to rotate and drive universal joint assembly 12, bearing assembly 15 and drill bit 14. The female coupler 22 of universal joint 18 will be orbiting about a longitudinal axis with an eccentricity, while female coupler 16 will be rotating concentrically about the longitudinal axis of downhole motor 11.

Thrust ball 52 supports any axial thrust load applied to the universal joints 16, 18, while allowing drive shaft 20 and female coupler 22 to pivot with respect to one another. Torque loads applied to the universal joint 16 are transmitted between female coupler 22 and drive shaft 20 by balls 54 located in the side pockets 30 of drive shaft 20. Each ball 54 is free to move axially in groove 56, allowing limited omnidirectional angular movement of male ends 24 of drive shaft 20 and female coupler 22 with respect to one another. Retainer 64 prevents separation of the drive shaft 20 from the female coupler 22.

Seals 60, 61 will prevent drilling fluid from entering chambers 34 of joints 16, 18 and contaminating the lubricant. One end of compensating piston 62 will be in contact with the drilling fluid surrounding the joint 16. The other end of compensating piston 62 will be in contact with the lubricating fluid that fills cavity 34. As the pressure in the drilling fluid changes, piston 62 will move axially in the space between the balls 54 and annular shoulder 68 of retainer 64 to maintain the lubricant inside female coupler 22 at the same pressure as the drilling fluid.

Angular misalignment between drive shaft male end 24 and female coupler 22 occurs continuously due to the orbiting motion of drive shaft 20 caused by the eccentricity of rotor 13*a*. The angular misalignment, shown in FIG. 3, will further deform one side of inner O-ring seals 60, while the side 180 degrees away is allowed to expand. In FIG. 3, the lower side of seals 60 is shown more deformed than the upper side. This alternate additional squeeze and relaxation cycles as drive shaft 20 orbits. Male end 24 follows a conical path. Piston 62 also follows a conical but different path.

As drilling fluid flows past the exterior of drive shaft 20, rearward facing shoulder 26*b* serves as a baffle to divert forward flowing drilling fluid outward to the exterior of retainer skirt 64*a*. If solids in the drilling fluid accumulate in this annular space between male end 24 and the inner diameter of skirt 64*a*, the mobility of drive shaft 20 relative to female coupler 22 will be impaired and the seal assembly could be damaged. Flow passages 70 in retainer skirt 64*a* allow outward flow from the annular space between shaft male end 24 and retainer skirt 64*a* to prevent the accumulation of solids. The flow passages 70 permit such solids to be transmitted under fluid pressure from the radial interior of retainer skirt 64*a* to its exterior.

The invention has significant advantages. The compensating piston reduces pressure differential across the seals. The compensating piston also reduces radial protrusion of the O-ring seals. The baffle and flow passages through the skirt of the retainer reduce the accumulation of solids between the female coupler and the male end.

While the invention has been shown and described in only one of its forms, it should be apparent to those skilled in the art that it is not so limited but is susceptible to various changes without departing from the scope of the invention.

We claim:

1. A universal joint assembly having a longitudinal axis and adapted to be coupled to a eccentric rotor located within a well, the universal joint assembly comprising:

a female coupler defining an interior cavity, the interior cavity having an end wall with a concave depression and an interior side wall;

a male coupler having an exterior side wall and an engagement end with a concave depression, the engagement end being received within the interior cavity of the female coupler;

each of the side walls having a plurality of circumferentially spaced recesses;

a thrust ball positioned between the concave depressions of the male and female couplers;

a plurality of ball members positioned in the circumferentially spaced recesses of the male and female couplers; and a seal assembly located between the side walls of the male and female couplers, defining a sealed chamber that contains the ball and the ball members and is adapted to be filled with a lubricant, the seal assembly comprising a compensating member having one side adapted to be in contact with the lubricant and another side adapted to be in contact with well fluid, the compensating member being free to move axially a limited distance toward the end wall of the female coupler to equalize pressure differential.

2. The universal joint assembly of claim 1, wherein the compensating member comprises an annular piston.

3. The universal joint assembly of claim 1, wherein the compensating member comprises an annular piston surrounding a portion of the male coupler, the male coupler rotating angularly relative to the compensating member.

4. A universal joint assembly having a longitudinal axis and adapted to be coupled to a eccentric rotor located within a well, the universal joint assembly comprising:

a female coupler defining an interior cavity, the interior cavity having an end wall with a concave depression and an interior side wall;

a male coupler having an exterior side wall and an engagement end with a concave depression, the engagement end being received within the interior cavity of the female coupler;

each of the side walls having a plurality of circumferentially spaced recesses;

a thrust ball positioned between the concave depressions of the male and female couplers;

a plurality of ball members positioned in the circumferentially spaced recesses of the male and female couplers;

a seal assembly located between the side walls of the male and female couplers, defining a sealed chamber that contains the ball and the ball members and is adapted to be filled with a lubricant, the seal assembly comprising a compensating member having one side adapted to be in contact with the lubricant and another side adapted to be in contact with well fluid, the compensating member being free to move axially a limited distance toward the end wall of the female coupler to equalize pressure differential; and wherein the compensating member comprises an annular piston that is axially movable toward the end wall of the female coupler until coming into abutment with the ball members.

5. A universal joint assembly having a longitudinal axis and adapted to be coupled to a eccentric rotor located within a well, the universal joint assembly comprising:

a female coupler defining an interior cavity, the interior cavity having an end wall with a concave depression and an interior side wall;

a male coupler having an exterior side wall and an engagement end with a concave depression, the engagement end being received within the interior cavity of the female coupler;

each of the side walls having a plurality of circumferentially spaced recesses;

a thrust ball positioned between the concave depressions of the male and female couplers;

a plurality of ball members positioned in the circumferentially spaced recesses of the male and female couplers;

a seal assembly located between the side walls of the male and female couplers, defining a sealed chamber that contains the ball and the ball members is adapted to be filled with a lubricant, the seal assembly comprising a compensating member having one side adapted to be in contact with the lubricant and another side adapted to be in contact with well fluid, the compensating member being free to move axially a limited distance toward the end wall of the female coupler to equalize pressure differential; wherein the female coupler further comprises:

a skirt that extends rearward past the seal assembly, defining an annular space surrounding a portion of the male coupler that has an open rearward end adapted to be exposed to well fluid; and a flow passage extending laterally through the skirt, communicating the annular space with the exterior of the skirt.

6. A universal joint assembly having a longitudinal axis and adapted to be coupled to a eccentric rotor located within a well, the universal joint assembly comprising:

a female coupler defining an interior cavity, the interior cavity having an end wall with a concave depression and an interior side wall;

a male coupler having an exterior side wall and an engagement end with a concave depression, the engagement end being received within the interior cavity of the female coupler;

each of the side walls having a plurality of circumferentially spaced recesses;

a thrust ball positioned between the concave depressions of the male and female couplers;

a plurality of ball members positioned in the circumferentially spaced recesses of the male and female couplers;

a seal assembly located between the side walls of the male and female couplers, defining a sealed chamber that contains the ball and the ball members and is adapted to be filled with a lubricant, the seal assembly comprising a compensating member having one side adapted to be in contact with the lubricant and another side adapted to be in contact with well fluid, the compensating member being free to move axially a limited distance toward the end wall of the female coupler to equalize pressure differential; and an annular shoulder on the male coupler adjacent an end of the female coupler for diverting well fluid away from spaces between the female coupler and the male coupler.

7. A universal joint assembly having a longitudinal axis and adapted to be coupled to a eccentric rotor located within a well, the universal joint assembly comprising:

a female coupler defining an interior cavity, the interior cavity having an end wall with a concave depression and an interior side wall;

a male coupler having an exterior side wall and an engagement end with a concave depression, the engagement end being received within the interior cavity of the female coupler;

each of the side walls having a plurality of circumferentially spaced recesses;

a thrust ball positioned between the concave depressions of the male and female couplers;

a plurality of ball members positioned in the circumferentially spaced recesses of the male and female couplers;

a seal assembly located between the side walls of the male and female couplers, defining a sealed chamber that contains the ball and the ball members and is adapted to be filled with a lubricant, the seal assembly comprising a compensating member having one side adapted to be in contact with the lubricant and another side adapted to be in contact with well fluid, the compensating member being free to move axially a limited distance toward the end wall of the female coupler to equalize pressure differential; wherein the female coupler further comprises:

a skirt that extends rearward past the seal assembly, defining an annular space surrounding a portion of the male coupler that has an open rearward end adapted to be exposed to well fluid; and wherein the male coupler further comprises:

an annular shoulder protruding radially from the male coupler adjacent an end of the skirt of the female coupler, the shoulder having a rearward facing portion for diverting well fluid away from the annular space between the female coupler and the male coupler.

8. A universal joint assembly having a longitudinal axis and adapted to be coupled to an eccentric rotor, the universal joint assembly comprising:

a female coupler defining an interior cavity, the interior cavity having an end wall with a concave depression and an interior side wall;

a male coupler having an exterior side wall and an engagement end with a concave depression, the engagement end being received within the interior cavity of the female coupler;

each of the side walls having a plurality of circumferentially spaced recesses;

a thrust ball positioned between the concave depressions of the male and female couplers;

a plurality of ball members positioned in the circumferentially spaced recesses of the male and female couplers;

a skirt that extends rearward past a seal assembly, defining an annular space surrounding a portion of the male coupler that has an open rearward end adapted to be exposed to well fluid; and at least one flow passage extending laterally through the skirt, communicating the annular space with the exterior of the skirt.

9. The universal joint assembly according to claim 8, further comprising:

a shoulder on the male coupler that faces away from the skirt and is inclined relative to the axis, the shoulder being located proximal and rearward from the end of the skirt, for diverting well fluid away from the annular space between the male and female couplers.

10. The universal joint assembly according to claim 8, further comprising:

an annular band on the male coupler having a rearward shoulder that faces away from the skirt and is inclined relative to the axis, and a forward shoulder that faces toward the end wall of the female coupler and is inclined relative to the axis, the annular band being located proximal the end of the skirt.

11. The universal joint assembly according to claim 10, wherein the annular band is located rearward from the end of the skirt.

12. The universal joint assembly of claim 8, further comprising:

a pressure compensator having one side adapted to be in contact with lubricant located in the cavity between the male and female couplers and another side adapted to be in contact with well fluid, the pressure compensator being movable to equalize pressure of the lubricant with that of the well fluid.

13. The universal joint assembly of claim 8, further comprising:
   a sealed chamber that contains the ball and the ball members and is adapted to be filled with a lubricant;
   a compensating member having one side adapted to be in contact with the lubricant and another side adapted to be in contact with well fluid, the compensating member being free to move axially a limited distance toward the end wall of the female coupler to equalize pressure differential.

14. The universal joint assembly according to claim 13, wherein the male coupler is adapted to be rotate angularly within the female coupler, wherein the compensating member is annular, surrounds a portion of the male coupler, and is fixed concentrically within the female coupler, the compensating member having an inner diameter sufficiently larger than said portion of the male coupler to accommodate the angular rotation of the male coupler.

15. A universal joint assembly adapted to be joined to an eccentric rotor located in a well, the universal joint assembly having a longitudinal axis and comprising:
   a female coupler having an interior cavity with an end wall having a concave depression and an interior side wall;
   a male coupler having an exterior side wall and an engagement end with a concave depression, the engagement end being received within the interior cavity of the female coupler;
   each of the side walls having a plurality of circumferentially spaced recesses;
   a thrust ball positioned between the concave depressions of the male and female couplers;
   a plurality of ball members positioned in the circumferentially spaced recesses of the male and female couplers;
   a sealed chamber between the side walls that is filled with a lubricant;
   a compensating member having one side in contact with the lubricant and another side adapted to be in contact with well fluid, the compensating member being free to move axially a limited distance toward the end wall of the female coupler to equalize pressure differential between the lubricant and the well fluid;
   a skirt on the female coupler that extends rearward past the compensating member, defining an annular space surrounding a portion of the male coupler that has an open rearward end adapted to be exposed to well fluid; and
   at least one flow passage extending laterally through the skirt, communicating the annular space with the exterior of the skirt to allow flow of well fluid from the annular space to the exterior of the skirt.

16. The universal joint assembly of claim 15, further comprising:
   an annular shoulder protruding radially from the male coupler at the open rearward end of the skirt, the shoulder being inclined to divert forward flowing well fluid over the exterior of the skirt.

17. The universal joint assembly of claim 15, wherein the compensating member comprises:
   an annular piston surrounding a portion of the male coupler and having an inner diameter sufficiently larger than an outer diameter of said portion of the male coupler to allow angular rotational movement of the male coupler;
   an outer seal located between the annular piston and the side wall of the female coupler; and
   an inner seal located between the piston and the male coupler, the outer seal having portions spaced 180 degrees apart from one another that alternately undergo additional squeeze and additional expansion due to the angular rotational motion of the male coupler.

* * * * *